United States Patent
Seseke-Koyro et al.

(10) Patent No.: US 6,648,212 B2
(45) Date of Patent: Nov. 18, 2003

(54) COMPONENTS COATED WITH AN ALUMINUM-SILICON ALLOY

(75) Inventors: Ulrich Seseke-Koyro, Isernhagen (DE); Joachim Frehse, Hannover (DE); Andreas Becker, Lachendorf (DE)

(73) Assignee: Solvay Pharmaceuticals GmbH, Hannover (DE)

( * ) Notice: Subject to any disclaimer, the term of this patent is extended or adjusted under 35 U.S.C. 154(b) by 0 days.

(21) Appl. No.: 09/997,483

(22) Filed: Dec. 3, 2001

(65) Prior Publication Data

US 2002/0070263 A1 Jun. 13, 2002

Related U.S. Application Data

(63) Continuation of application No. PCT/EP00/04777, filed on May 25, 2000.

(30) Foreign Application Priority Data

Jun. 2, 1999 (DE) .......................... 199 25 301

(51) Int. Cl.$^7$ .......................... B23K 1/20; B23K 31/02; B23K 35/34
(52) U.S. Cl. .................. 228/208; 228/214; 228/217; 228/223; 228/224; 228/207; 148/23; 148/24; 148/25; 148/26
(58) Field of Search .................. 228/208, 223, 228/207, 262.5, 262.51, 217, 214, 224; 148/23–26

(56) References Cited

U.S. PATENT DOCUMENTS

| | | | | |
|---|---|---|---|---|
| 3,553,825 A | * | 1/1971 | Dockus et al. ............. | 29/487 |
| 4,905,887 A | * | 3/1990 | Schoer et al. ............. | 228/217 |
| 4,906,307 A | * | 3/1990 | Fujiyoshi .................. | 148/26 |
| 4,989,775 A | * | 2/1991 | Shimajiri et al. ........... | 228/218 |
| 5,100,048 A | * | 3/1992 | Timsit ....................... | 228/198 |
| 5,100,486 A | * | 3/1992 | Krikorian et al. ........... | 148/248 |
| 5,171,378 A | * | 12/1992 | Kovarik et al. ............. | 148/24 |
| 5,316,863 A | * | 5/1994 | Johnson et al. ............. | 428/548 |
| 5,504,296 A | * | 4/1996 | Sato et al. .................. | 148/24 |
| 5,785,770 A | * | 7/1998 | Meshri et al. .............. | 148/22 |
| 6,019,856 A | * | 2/2000 | Born et al. ................. | 148/23 |
| 6,113,667 A | * | 9/2000 | Hyogo et al. ............... | 75/255 |
| 6,158,648 A | * | 12/2000 | Mori et al. ................. | 228/205 |
| 6,234,377 B1 | * | 5/2001 | Teshima et al. ............. | 148/24 |
| 6,432,221 B1 | * | 8/2002 | Seseke-Koyro et al. ...... | 148/24 |

FOREIGN PATENT DOCUMENTS

| | | | |
|---|---|---|---|
| DE | 19636897 | | 3/1998 |
| DE | 19913111 | | 9/1999 |
| DE | 10022840 A | * | 11/2001 |
| EP | 0810057 | | 12/1997 |
| GB | 2339161 | | 1/2000 |
| JP | 62-282799 A | * | 12/1987 |
| JP | 63-002590 A | * | 1/1988 |
| JP | 01-104496 A | * | 4/1989 |
| JP | 01-104497 A | * | 4/1989 |
| JP | 04-84691 A | * | 3/1992 |
| JP | 04-303961 A | * | 11/1995 |
| JP | 63-177999 A | * | 1/1996 |
| JP | 08-267229 A | * | 10/1996 |

OTHER PUBLICATIONS

Copy of the Search Report.

* cited by examiner

*Primary Examiner*—M. Alexandra Elve
*Assistant Examiner*—L. Edmondson
(74) *Attorney, Agent, or Firm*—Crowell & Moring LLP

(57) ABSTRACT

Components composed of aluminum or an aluminum alloy with a coating comprising an aluminum-silicon alloy deposited thereon by applying an alkali metal fluorosilicate and heating the resulting treated material. The alloy layer is effectively protected against re-oxidation by a non-corrosive, alkali metal fluoroaluminate layer (e.g. a potassium fluoroaluminate layer) which forms simultaneously.

24 Claims, No Drawings

COMPONENTS COATED WITH AN ALUMINUM-SILICON ALLOY

CROSS REFERENCE TO RELATED APPLICATION

This application is a continuation of international application Ser. No. PCT/EP00/04777, filed May 25, 2000, designating the United States of America, the entire disclosure of which is incorporated herein by reference. Priority is claimed based on Federal Republic of Germany patent application No. DE 199 25 301.3, filed Jun. 2, 1999.

BACKGROUND OF THE INVENTION

The invention relates to a process for depositing an aluminum-silicon alloy on aluminum or aluminum alloys, the resulting components which are obtained, and a brazing process.

Techniques for brazing components made of aluminum or aluminum alloys are known. The components are joined with the aid of a brazing metal and a flux while being heated. The brazing metal can either be added separately or components plated with brazing metal can be used. The preferred fluxes are potassium fluoroaluminate and/or cesium fluoroaluminate.

U.S. Pat. No. 4,906,307 discloses a process for brazing components made of an aluminum alloy. Brazing metal plated components are used with a flux comprising 70 to 90 wt % potassium hexafluorosilicate and 30 to 10 wt % aluminum trifluoride, with the addition of lithium fluoride and sodium fluoride.

U.S. Pat. No. 5,785,770 (=EP 810,057) discloses fluxes for brazing aluminum, which can contain up to 20 wt % of a metal fluorosilicate (in addition to a fluoroaluminate complex, e.g., potassium tetrafluoro-aluminate). Solderless brazing is also possible with certain alkali metal fluorosilicates within certain weight ranges.

U.S. Pat. No. 6,019,856 (=DE 196 36 897) discloses that solderless brazing of aluminum components is possible using a flux containing 6 to 50 wt % potassium hexafluorosilicate and, in addition, potassium fluoroaluminate.

SUMMARY OF THE INVENTION

The object of the present invention is to provide a process that can be used to deposit an aluminum-silicon alloy on aluminum or aluminum alloys (or corresponding components) without a brazing metal having to be applied by roller plating.

A further object of the invention is to provide a process for brazing aluminum or aluminum alloy components where a separate addition of a brazing metal is not necessary.

An additional object of the invention is to provide aluminum or aluminum alloy components which can be brazed without a separate addition of brazing metal.

These and other objects are attained in accordance with the present invention by providing a process for producing a component of aluminum or an aluminum alloy with a coating comprising alkali metal hexafluorosilicate, comprising applying alkali metal hexafluorosilicate or a mixture of alkali metal hexafluorosilicate and up to 5 wt % of a fluoroaluminate, relative to the alkali metal hexafluorosilicate, to the component by a dry or a wet fluxing process.

In accordance with a further aspect of the invention, the objects are achieved by providing a process for producing a component of aluminum or an aluminum alloy with a coating that comprises an aluminum-silicon alloy, comprising applying alkali metal hexafluorosilicate or a mixture of alkali metal hexafluorosilicate and up to 5 wt % of a fluoroaluminate, relative to the alkali metal hexafluorosilicate, to the component, and heating the component until the aluminum-silicon alloy is formed.

The objects are achieved in yet another aspect of the invention by providing a process for joining components of aluminum or aluminum alloys, comprising coating the components with a coating comprising alkali metal hexafluorosilicate, placing the components in contact, and brazing the components together.

In accordance with a still further aspect of the invention by providing a process for joining components of aluminum or aluminum alloys, comprising coating the components with a coating comprising an aluminum-silicon alloy, placing the components in contact, and brazing the components together.

Another aspect of the invention fulfills the objects thereof by providing components of aluminum or an aluminum alloy coated with a coating comprising at least one alkali metal hexafluorosilicate.

The objects of yet another aspect of the invention are achieved by providing components of aluminum or an aluminum alloy coated with a coating comprising an aluminum-silicon alloy.

The process according to the invention for producing aluminum or an aluminum alloy with a coating that comprises an aluminum silicon alloy includes coating the aluminum or an aluminum alloy with alkali metal hexafluorosilicate and heating the coated aluminum or aluminum alloy until the aluminum silicon alloy forms.

Preferred alkali metal hexafluorosilicates include potassium hexafluorosilicate, cesium hexafluorosilicate or mixtures thereof. Potassium hexafluorosilicate is especially preferred.

It is particularly preferred to deposit the alkali metal fluorosilicate with a weight per unit area of 30 to 60 g/m$^2$. This can be accomplished, for example, by electrostatically depositing the dry hexafluorosilicate powder, or the deposition can be effected from an aqueous phase (i.e., from a solution or suspension of the silicate). If the weights per unit area are lower, a thinner alloy coating results, if they are higher the alloy coating is thicker. Alloy formation for joining components occurs even at weights per unit area starting from 5 g/m$^2$. For most applications, a weight per unit area of at least 20 g/m$^2$ to 60 g/m$^2$ is more advantageous because correspondingly more alloy metal will then be available for a stable brazing joint (brazing seam) of the assembly.

The alkali metal hexafluorosilicate may be applied to the material to be joined in the form of a slurry in water or in organic solvents or also in the form of a paste. These slurries advantageously contain 15 to 75 wt % of hexafluorosilicate. In addition to water, organic liquids may also be used, particularly alcohols, such as methanol, ethanol, propanol or isopropanol, or polyols. Other suitable organic liquids include ether, e.g., diethylene glycol monobutyl ether, ketones such as acetone, esters of monobasic alcohols, diols or polyols. An example of a suitable binder for use in paste form is ethyl cellulose. Film formers, which typically are polymers that are soluble in organic solvents such as acetone, can be used to apply the hexafluorosilicate to the component. After evaporation of the solvent they form a firmly adhering film. Suitable polymers include, for example, acrylates and/or methacrylates.

A material with a fine grain spectrum is particularly suitable for wet fluxing. A material with a coarser grain spectrum is particularly well suited for dry fluxing. A material with a desired fine or coarser grain spectrum can be produced by means of known methods. Typically, an alkali lye is used with hexafluorosilicic acid (precursors are also suitable, e.g., alkali carbonate). The way to influence the grain size is generally known. Smaller crystals are created at a low reaction temperature, faster reaction rate, faster drying and stronger movement of the reaction mixture. Larger crystals are produced at a higher temperature, through standing over the mother liquor, little movement of the reaction mixture and slower mixing of the reactants.

Hexafluorosilicate, or mixtures containing it, which essentially have particles of a grain size of 8 to less than 20 μm, e.g., up to 18 μm, are very suitable for dry fluxing. For instance, $K_2SiF_6$ was produced with $X_{D10}$=2.04 μm, $X_{D50}$=6.94 m and $X_{D50}$=12.35 μm and an average grain diameter of 6.94 μm. Another product was finer still, with an $X_{D50}$ of 4.6 μm. This grain size data relates to the average grain size diameter for 50% of the particles ($X_{D50}$) as determined by laser diffraction. Fluxes essentially having particles with a grain size ranging from 1 to 12.5 μm can be particularly well applied as a slurry in water or organic liquids using the wet fluxing method.

The aluminum or aluminum alloy is preferably heated to a temperature ranging from 400 to 610° C., preferably 540 to 610° C. to form the aluminum-silicon alloy. If potassium hexafluorosilicate is used, it is preferably heated to a temperature ranging from 570 to 600° C.

Coating and brazing may be done in a single operation. First the alloy is formed, and then brazing takes place. It is also possible to separate the coating and brazing process over time. The components are first coated. Then they are typically allowed to cool and are stored until brazing is effected by renewed heating. Coating and brazing can of course also be spatially separated. The process is therefore very flexible.

It has been found that components made of aluminum or aluminum alloys and coated with an aluminum silicon alloy according to the invention can be brazed without a brazing additive. This may be accomplished, for example, by the method of open flame brazing or furnace brazing, unless the time span that has elapsed between coating and brazing has been so long that the surface of the parts or points to be brazed has aged. If such a time span has elapsed between the coating process and the subsequent brazing process and aging of the surface has occurred, a flux can be used, for instance a flux composed of potassium fluoroaluminate or cesium fluoroaluminate. The advantage is that the surface loading with flux can be very low if desired, e.g., ranging from 2 to 30 g/m².

In accordance with one embodiment, pure alkali metal hexafluorosilicate is used. This may be a mixture of alkali metal hexafluorosilicates.

According to another embodiment, a flux composed of fluoroaluminate, for example potassium fluoroaluminate and/or cesium fluoroaluminate, can be applied either simultaneously with the alkali metal hexafluorosilicate or after producing the alloy coating. The fluoroaluminate is present in an amount of maximum 15 wt % relative to the employed alkali metal hexafluorosilicate, preferably in an amount of maximum 10 wt %, particularly in an amount of maximum 5 wt %, if this embodiment is used. Such a mixture is also a subject of the invention.

The term "components of aluminum or an aluminum alloy" in the context of the present invention is to be understood as those components which, if coated with the inventive process, are joined particularly by brazing to form subassemblies. "Components" also include prefabricated parts, e.g., aluminum sheet, aluminum profiles, aluminum tubes or other shapes made of aluminum or aluminum alloys that can be made into components after further processing, which in turn can then be brazed together to form subassemblies. They are, for example, components which after brazing produce radiators, heat exchangers or evaporators.

The invention also relates to components of aluminum or aluminum alloy obtained by the inventive process, coated with an aluminum silicon alloy.

The components of aluminum or aluminum alloys produced by the process according to the invention can be brazed using a brazing flux if necessary, e.g., potassium fluoroaluminate, cesium fluoroaluminate, or their mixtures. This is accomplished in a known manner, for instance in a brazing furnace or by open flame brazing at a temperature ranging from 400 to 610° C., depending on the flux.

The invention has the advantage that the components obtained by means of the inventive process can be brazed immediately without adding any flux. If a flux is added for brazing that is to be performed later, this flux can be applied at a low weight per unit area. The alkali fluoroaluminate coating forming in addition to the alloy coating provides effective protection against reoxidation.

EXAMPLE 1

Production of an Aluminum Component Coated with an Aluminum-silicon Alloy

A swatch of aluminum (size: 25×25 mm) was coated with 40 g/m² $K_2SiF_6$, which was homogenously distributed by applying it as a suspension in isopropanol. After evaporation of the solvent, the swatch was heated in a furnace under nitrogen to 600° C. (CAB process=Controlled Atmosphere Brazing). After this temperature cycle, the swatch was removed from the furnace after cooling. An Al-Si surface with metallic luster had formed on the swatch.

EXAMPLE 2

Brazing of Aluminum Components Coated with an Al-Si Alloy

The swatch produced in accordance with Example 1 was coated with 5 g/m² potassium fluoroaluminate flux (Nocolok$^R$, trademark of Alcan Corp.; supplier: Solvay Fluor and Derivate GmbH), which was homogenously distributed by application as a suspension in isopropanol. An aluminum angle was positioned on the swatch, the assembly was placed into the brazing furnace and was processed again as described in Example 1. After brazing, the swatch with the aluminum angle was removed. The angle was 100% firmly and homogenously brazed together with the swatch while forming a brazed seam.

EXAMPLE 3

Single Step Brazing without Brazing Additive

A swatch of aluminum (size: 25×25) was coated with 20 g/m² $K_2SiF_6$, which was homogenously distributed by application as a suspension in isopropanol. A 90° aluminum angle with a total length of 40 mm was placed on the surface thus prepared. This assembly was then heated to 600° C. under nitrogen in a furnace (CAB process=Controlled Atmosphere Brazing). After this temperature cycle, the swatch was removed from the furnace after cooling. A strong brazed joint between the two individual parts had formed around the entire circumference.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for producing a component of aluminum or an aluminum alloy with a coating comprising alkali metal hexafluorosilicate, said process comprising applying a flux consisting essentially of alkali metal hexafluorosilicate to the component by a dry fluxing process or a wet fluxing process wherein a slurry or a paste in an organic solvent is used.

2. A process according to claim 1, wherein the alkali metal hexafluorosilicate is applied together with a binder or film former.

3. A process according to claim 1, wherein the alkali metal hexafluorosilicate is potassium hexafluorosilicate, cesium hexafluorosilicate, or a mixture thereof.

4. A process according to claim 1, wherein from 30 to 60 grams of alkali metal fluorosilicate are applied to the component per square meter of component surface area.

5. A process for producing a component of aluminum or an aluminum alloy with a coating that comprises an aluminum-silicon alloy, said process comprising applying a flux consisting essentially of alkali metal hexafluorosilicate to the component, wherein a slurry or a paste in an organic solvent is used, and heating the component until the aluminum-silicon alloy is formed.

6. A process according to claim 5, wherein the alkali metal hexafluorosilicate is applied by a dry fluxing process.

7. A process according to claim 5, wherein the alkali metal hexafluorosilicate is applied by a wet fluxing process.

8. A process according to claim 5, wherein the alkali metal hexafluorosilicate is applied together with a binder or film former.

9. A process according to claim 5, wherein the alkali metal hexafluorosilicate is potassium hexafluorosilicate, cesium hexafluorosilicate, or a mixture thereof.

10. A process according to claim 5, wherein from 30 to 60 grams of alkali metal fluorosilicate are applied to the component per square meter of component surface area.

11. A process according to claim 5, wherein the component is heated to a temperature of from 540 to 610° C. to form the aluminum-silicon alloy.

12. A process according to claim 5, wherein the alloy is formed without any addition of aluminum fluoride or alkali fluoroaluminates.

13. A component of aluminum or an aluminum alloy coated with a coating comprising at least one alkali metal hexafluorosilicate produced by the process of claim 1.

14. A component of aluminum or an aluminum alloy coated with a coating comprising an aluminum-silicon alloy produced by the process of claim 5.

15. A process for joining components of aluminum or aluminum alloys, said process comprising coating the components by applying a flux consisting essentially of an alkali metal hexafluorosilicate wherein a slurry or a paste in an organic solvent is used, placing the components in contact, and brazing the components together.

16. A process according to claim 15, wherein brazing is carried out without application of any flux comprising aluminum fluoride or an alkali metal fluoroaluminate.

17. A process for joining components of aluminum or aluminum alloys, said process comprising coating the components with a coating comprising an aluminum-silicon alloy, placing the components in contact, and brazing the components together, wherein said coating comprising an aluminum-silicon alloy was produced by the process of claim 5.

18. A process according to claim 17, wherein a brazing flux is applied to the components.

19. A process according to claim 17, wherein brazing is carried out without application of a brazing flux.

20. A process according to claim 17, wherein brazing is carried out without application of any flux comprising aluminum fluoride or an alkali metal fluoroaluminate.

21. A composition of matter consisting essentially of a mixture of at least one alkali metal fluoro silicate and at least one alkali metal fluoroaluminate, wherein the alkali metal fluoroaluminate is present in an amount of up to 5 wt % of the alkali metal fluorosilicate.

22. A composition of matter according to claim 21, wherein the alkali metal is potassium, cesium or a mixture thereof.

23. The process of claim 1, wherein the organic solvent is selected from the group consisting of methanol, ethanol, propanol, isopropanol, diethylene glycol monobutyl ether, and acetone.

24. The process of claim 1, wherein the organic solvent is selected from the group consisting of esters of alcohols, polyols, ethers, ketones, and esters of monobasic alcohols, diols, and polyols.

* * * * *